(12) United States Patent
Manami et al.

(10) Patent No.: US 8,038,547 B2
(45) Date of Patent: *Oct. 18, 2011

(54) GOLF BALL

(75) Inventors: Toshihiko Manami, Chichibu (JP); Hiroshi Higuchi, Chichibu (JP)

(73) Assignee: Bridgestone Sports Co., Ltd., Tokyo (JP)

( * ) Notice: Subject to any disclaimer, the term of this patent is extended or adjusted under 35 U.S.C. 154(b) by 152 days.

This patent is subject to a terminal disclaimer.

(21) Appl. No.: 12/175,290

(22) Filed: Jul. 17, 2008

(65) Prior Publication Data

US 2008/0274826 A1    Nov. 6, 2008

Related U.S. Application Data

(63) Continuation-in-part of application No. 11/783,939, filed on Apr. 13, 2007, now Pat. No. 7,527,566.

(51) Int. Cl.
*A63B 37/06* (2006.01)
(52) U.S. Cl. ...................................................... 473/373
(58) Field of Classification Search .................. 473/373, 473/374, 376
See application file for complete search history.

(56) References Cited

U.S. PATENT DOCUMENTS

| 6,838,501 | B2  |   | 1/2005 | Takesue et al. |         |
|-----------|-----|---|--------|----------------|---------|
| 7,091,269 | B2  |   | 8/2006 | Takesue et al. |         |
| 7,527,566 | B2  | * | 5/2009 | Manami et al.  | 473/376 |
| 2005/0020783 | A1 | * | 1/2005 | Takesue et al. | 525/439 |

FOREIGN PATENT DOCUMENTS

| JP | 2002-219195 A | 8/2002 |
|----|---------------|--------|
| JP | 2005-13487 A  | 1/2005 |

* cited by examiner

*Primary Examiner* — Raeann Gorden
(74) *Attorney, Agent, or Firm* — Sughrue Mion, PLLC

(57) ABSTRACT

The present invention provides a golf ball composed of a core, an outermost cover layer and one or more intermediate layer therebetween. At least one intermediate layer includes a mixture composed of a base polymer made of, in a specific ratio, (a) a metal ion neutralization product of an olefin-unsaturated carboxylic acid random copolymer and/or a metal ion neutralization product of an olefin-unsaturated carboxylic acid-unsaturated carboxylic acid ester random copolymer, (b) a thermoplastic elastomer selected from the group consisting of thermoplastic polyester elastomers, thermoplastic block copolymers and thermoplastic polyurethanes, and (c) a thermoplastic block copolymer containing end blocks modified by a functional group having reactivity with an ionomer resin, both end blocks being formed of different comonomers. The mixture also includes (e) an organic acid of 18 to 40 carbons or a derivative thereof, and (f) a metal ion source selected from the group consisting of alkali metals, alkaline earth metals and transition metals. The mixture has an optimized difference between the melt viscosities of (b) and (a) as measured under a shear rate of 6,000 sec$^{-1}$ and 240° C. in accordance with JIS K-7199. The golf ball of the invention has a flight and control performance acceptable for use by professional golfers and skilled amateurs, and also has an excellent durability to cracking under repeated impact.

5 Claims, 1 Drawing Sheet

GOLF BALL

CROSS-REFERENCE TO RELATED APPLICATION

Figure 1:
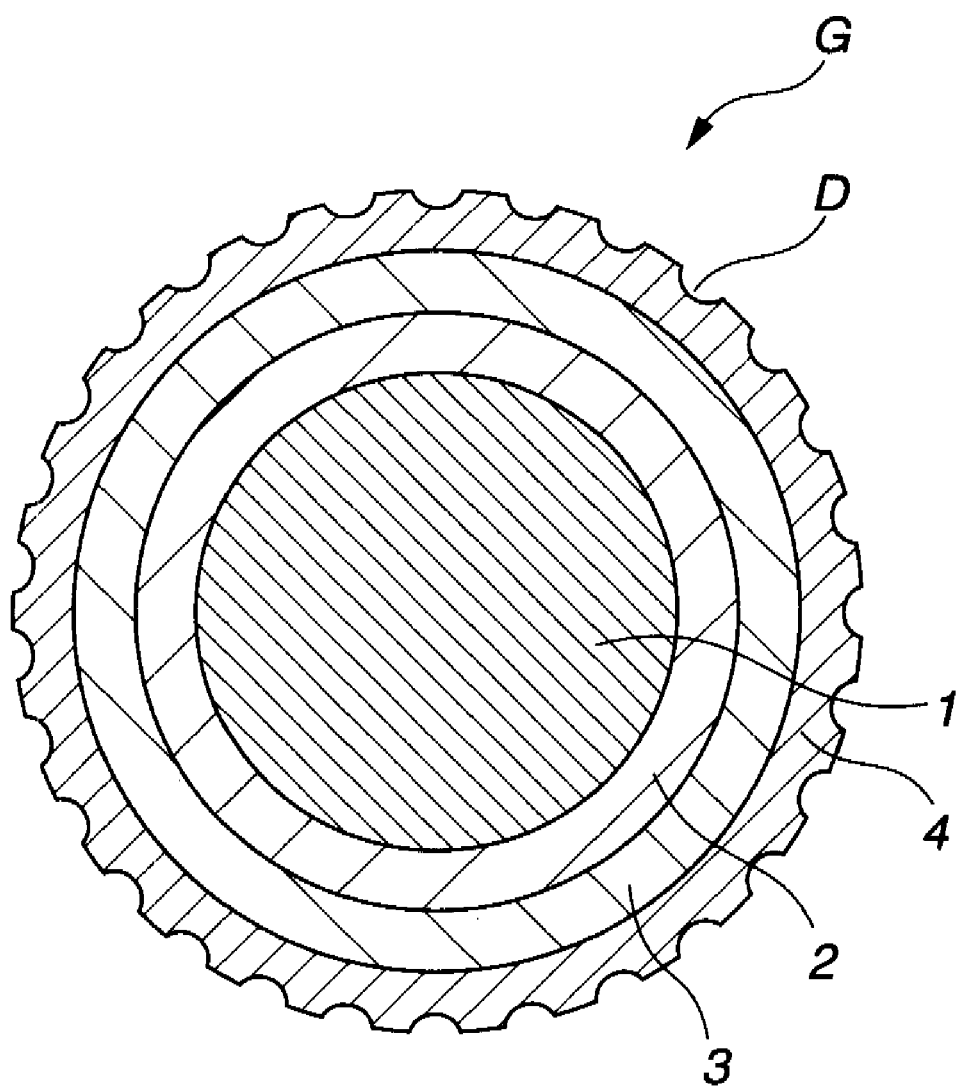

This application is a continuation-in-part of application Ser. No. 11/783,939 filed on Apr. 13, 2007, now U.S. Pat. No. 7,527,566, the contents of which are hereby incorporated by reference.

BACKGROUND OF THE INVENTION

The present invention relates to a multi-layer golf ball having a core, a cover, and at least one intermediate layer position therebetween. More specifically, the invention relates to a golf ball which has a flight and control performance acceptable for use by professional golfers and skilled amateurs, and which also has an excellent durability to cracking under repeated impact.

In addition to having a good rebound, it is important for the enjoyment of the game that a golf ball also provide the player with a good feel on impact. To impart such a feel, the cover serving as the outermost layer is generally made soft. Art to this effect has been disclosed in numerous patent publications.

For example, one disclosure for ensuring a Shore D hardness of about 50 and resilience involves blending a thermoplastic polyester elastomer or an olefinic thermoplastic elastomer into a cover material in which an ionomer serves as the base resin.

Yet, such a cover material still leaves something to be desired in terms of resilience. Improvements have thus been disclosed in which behenic acid and calcium hydroxide are added to the cover material so as to carry out a high degree of neutralization and thereby impart a high resilience. Such art is described in, for example, U.S. Pat. No. 6,838,501 (corresponding to JP-A 2002-219195) and U.S. Pat. No. 7,091,269 (corresponding to JP-A 2005-013487).

However, in the former, a non-ionomeric material having a high melt viscosity is used in the cover material, making it difficult to achieve a thin cover by injection molding. In the latter, high-speed injection molding of the cover material causes laminar separation to occur, lowering the durability of the ball.

SUMMARY OF THE INVENTION

It is therefore an object of the present invention to provide a golf ball which has an acceptable flight performance and controllability and which, even when a thin intermediate layer is used, has an excellent durability to cracking on repeated impact.

As a result of extensive investigations, the inventor has found that golf balls which contain a thin intermediate layer composed of a specific novel material have an excellent flight performance and controllability, and also have an excellent durability to cracking on repeated impact.

Thermoplastic polyester elastomers generally have a low melt viscosity and a good resilience, but they lack compatibility with ionomers. In particular, when the ionomer is highly neutralized, if the resins have a large difference in melt viscosity, laminar separation tends to occur. Hence, the present invention, by using an ionomer and a thermoplastic polyester elastomer together and thus balancing the different melt viscosities of the two resins, creates a resin which resists laminar separation even when the ionomer is highly neutralized and high-speed injection molding is carried out. The invention also reflects the finding that, to be able to achieve a thin intermediate layer having a thickness of 1.2 mm or less, when the combined resin is injection-molded at a high speed, it is important from the standpoint of durability to balance the melt viscosities of the differing constituent resins.

Accordingly, the invention provides the following golf balls.

[1] A golf ball comprising a core, an outermost cover layer and one or more intermediate layer therebetween, wherein at least one intermediate layer includes a mixture comprising:
100 parts by weight of a base polymer composed of
  (a) a metal ion neutralization product of an olefin-unsaturated carboxylic acid random copolymer and/or a metal ion neutralization product of an olefin-unsaturated carboxylic acid-unsaturated carboxylic acid ester random copolymer,
  (b) a thermoplastic elastomer selected from the group consisting of thermoplastic polyester elastomers, thermoplastic block copolymers and thermoplastic polyurethanes, and
  (c) a thermoplastic block copolymer containing end blocks modified by a functional group having reactivity with an ionomer resin, both end blocks being formed of different comonomers
  in a weight ratio a/b/c=50 to 80/50 to 20/4 to 20,
  (e) 5 to 150 parts by weight of an organic acid of 18 to 40 carbons or a derivative thereof, and
  (f) 0.1 to 10 parts by weight of a metal ion source selected from the group consisting of alkali metals, alkaline earth metals and transition metals:
which mixture satisfies the condition $0 \leq (b)-(a) \leq 25$, where (b)-(a) is the difference between the melt viscosity of component (b) and the malt viscosity of component (a) as measured at a shear rate of 6,000 $sec^{-1}$ and 240° C. in accordance with JIS K-7199.

[2] The golf ball of [1], wherein the mixture additionally comprises 10 to 30 parts by weight of an inorganic filler which is non-reactive with the ionomer resin (d) per 100 parts by weight of the base polymer.

[3] The golf ball of [2], wherein component (b) is a thermoplastic polyester elastomer

[4] The golf ball of [1], wherein the intermediate layer comprised of above components (a) to (f) has a thickness of at most 1.2 mm.

BRIEF DESCRIPTION OF THE DIAGRAM

FIG. 1 is a schematic cross-sectional view of a multi-piece solid golf ball (four-layer structure) according to one embodiment of the invention.

DETAILED DESCRIPTION OF THE INVENTION

The core of the inventive golf ball may be a rubber core obtained by molding and vulcanizing a rubber composition containing primarily a commonly used base rubber. Specifically, the core is made of a molded and vulcanized material prepared from a rubber composition containing the following ingredients A to E;

| | |
|---|---|
| (A) base rubber | 100 parts by weight |
| (B) unsaturated carboxylic acid and/or metal salt thereof | 10 to 50 parts by weight |
| (C) organosulfur compound | 0.1 to 5 parts by weight |
| (D) inorganic filler | 5 to 80 parts by weight, and |
| (E) organic peroxide | 0.1 to 3 parts by weight. |

Other ingredients, such as antioxidants and elemental sulfur, may be added to the rubber composition an needed in a combined amount of from 0.05 to 3 parts by weight per 100 parts by weight of component A.

The base rubber (A) of this rubber composition, while not subject to any specific limitation, is typically a general-purpose synthetic rubber used in core formulations, and preferably one in which polybutadiene serves as the primary component. "Primary component" here signifies that the polybutadiene accounts for at least 50 wt %, preferably at least 70 wt %, and most preferably 100 wt %, of the base rubber.

The polybutadiene is product synthesized using a rare earth catalyst or a group VIII catalyst. The synthesis catalyst is preferably a rare-earth catalyst. Known rare-earth catalysts may be used for this purpose, such as catalysts made up of a combination of a lanthanide series rare-earth compound, an organoaluminum compound, an alumoxane, a halogen-bearing compound and an optional Lewis base, or containing a metallocene complex.

Sulfur may be added to the polybutadiene to increase the core hardness distribution. Such sulfur is exemplified by powdered sulfur, a specific example of which is the dispersible sulfur manufactured by Tsurumi Chemical Industry Co., Ltd. under the trade name "Sulfur Z."

Next, the properties of the solid core used in the inventive golf ball are described.

It is recommended that the solid core have a diameter of generally at least 34.0 mm, preferably at least 35.0 mm, more preferably at least 35.5 mm, and most preferably at least 36.3 mm, but generally not more than 41.0 mm, preferably not more than 39.0 mm, more preferably than 38.5 mm, and most preferably not more than 38.2 mm.

The hardness difference calculated by subtracting the Shore D hardness at the center of the solid core from the Shore D hardness at the surface of the core is adjusted to generally at least 10, preferably at least 12, more preferably at least 13, and most preferably at least 14, but not more than 40, preferably not more than 36, more preferably not more than 31, and most preferably not more than 25. Optimizing this hardness difference lowers the spin rate on full shots taken with a driver, enabling the distance traveled by the ball to be increased.

The surface hardness of the core is the value obtained by directly measuring the hardness at the core surface with a Shore D durometer. The core center hardness is the value obtained by cutting the core in half and measuring the hardness at the center of the resulting section with a Shore D durometer. Each of these hardness values is the average of the measurements obtained at two points on ten cores.

The core may be obtained by vulcanizing and curing the above-described rubber composition using a method similar to that employed with known rubber compositions for golf balls. For example, vulcanization may be carried out at a temperature of between 100 and 200° C. for a period of between 10 and 40 minutes.

In the practice of the invention, at least one intermediate layer is interposed between the core and the cover serving as the outermost layer. For example, FIG. 1 shows a multi-piece solid golf ball G which is composed of four layers: a core 1 and an outermost cover layer 4 having a plurality of dimples D formed thereon, between which are provided a first intermediate layer 2 and a second intermediate layer 3 that encloses the first intermediate layer 2.

At least one of the intermediate layers in the inventive golf ball is formed of a resin composition consisting primarily of: 100 parts by weight of a base polymer composed of
(a) a metal ion neutralization product of an olefin-unsaturated carboxylic acid random copolymer and/or a metal ion neutralization product of an olefin-unsaturated carboxylic acid-unsaturated carboxylic acid aster random copolymer,
(b) a thermoplastic elastomer selected from the group consisting of thermoplastic polyester elastomers, thermoplastic block copolymers and thermoplastic polyurethanes, and
(c) a thermoplastic block copolymer containing end blocks modified by a functional group having reactivity with an ionomer resin, both end blocks being formed of different comonomers
in a weight ratio a/b/c=50 to 80/50 to 20/4 to 20,
(e) 5 to 150 parts by weight of an organic acid of 18 to 40 carbons or a derivative thereof, and
(f) 0.1 to 10 parts by weight of a metal ion source selected from the group consisting of alkali metals, alkaline earth metals and transition metals.

Component (a)

The olefin in component (a) has a number of carbons which is generally at least 2 but not more than 8, and preferably not more than 6. Specific examples include ethylene, propylene, butane, pentene, hexene, heptene and octene. Ethylene is especially preferred.

Examples of the unsaturated carboxylic acid in component (a) include acrylic acid, methacrylic acid, maleic acid and fumaric acid. Acrylic acid and methacrylic acid are especially preferred.

The unsaturated carboxylic acid ester in component (a) is preferably a lower alkyl ester of the above unsaturated carboxylic acid. Specific examples include methyl methacrylate, ethyl methacrylate, propyl methacrylate, butyl methacrylate, methyl acrylate, ethyl acrylate, propyl acrylate and butyl acrylate. Butyl acrylate (n-butyl acrylate, i-butyl acrylate) is especially preferred.

In the practice of the invention, above component (a) may include art olefin-unsaturated carboxylic acid random copolymer and/or an olefin-unsaturated carboxylic acid-unsaturated carboxylic acid aster random copolymer (referred to below as "the random copolymers"). These random copolymers may be respectively obtained by preparing each of the above-described materials and using a known method to carry out random copolymerization.

It is preferable for the above random copolymers to have controlled unsaturated carboxylic acid contents (acid contents). Here, it is recommended that the content of unsaturated carboxylic acid present in the random copolymer of component (a) be generally at least 4 wt %, preferably at least 6 wt %, more preferably at least 8 wt %, and even more preferably at least 10 wt %, but not more than 30 wt %, preferably not more than 20 wt %, more preferably not more than 18 wt %, and even more preferably not more than 15 wt %.

The metal ion neutralization product of the olefin-unsaturated carboxylic acid random copolymer and the metal ion neutralization product of the olefin-unsaturated carboxylic acid-unsaturated carboxylic acid ester random copolymer in the invention (referred to below as "the metal ion neutralization products") may be obtained by neutralizing some of the acid groups on the above random copolymers with metal ions.

Illustrative examples of metal ions that may be used here for neutralizing acid groups include $Na^+$, $K^+$, $Li^+$, $Zn^{++}$, $Mg^{++}$ and $Ca^{++}$. The use of $Na^+$ is preferred.

To obtain the metal ion neutralization product of a random copolymer used in the invention, it suffices to neutralize the above-described random copolymer with the above-mentioned metal ions. For example, use may be made of a method that involves neutralization using a compound such as a formats, acetate, nitrate, carbonate, bicarbonate, oxide, hydroxide or alkoxide of the above metal ions. To further facilitate molding at the time of resin mixture, the degree of neutralization of the random copolymer by these metal ions is generally at least 10%, and preferably at least 20%, but generally not more than 80%, and preferably not more than 70%.

Component (b)

Thermoplastic polyester elastomers that may be used as component (b) are composed primarily of hard segments which are high-melting crystalline polymer segments made up of crystalline aromatic polyester units, and soft segments which are low-melting polymer segments made up of aliphatic polyether units and/or aliphatic polyester units.

Preferred examples of the high-melting crystalline polymer serving as the hard segments include polybutylene terephthalates derived from terephthalic acid and/or dimethyl terephthalate in combination with 1,4-butanediol. Other illustrative examples include polyesters derived from a dicarboxylic acid component such as isophthalic acid, phthalic acid, naphthalene-2,6-dicarboxylic acid, naphthalene-2,7-dicarboxylic acid, diphenyl-4,4'-dicarboxylic acid, diphenoxyethanedicarboxylic acid, 5-sulfoisophthalic acid or ester-forming derivatives thereof in combination with a diol having a molecular weight of up to 300, such as an aliphatic diol (e.g., ethylene glycol, trimethylene glycol, pentamethylene glycol, hexamethylene glycol, neopentyl glycol, decamethylene glycol), an alicyclic diol (e.g., 1,4-cyclohexanedimethanol, tricyclodecanedimethylol), or an aromatic diol (e.g., xylylene glycol, bis(p-hydroxy)diphenyl, bis(p-hydroxyphenyl)propane, 2,2-bis[4-(2-hydroxyethoxy)-phenyl]propane, bis[4-(2-hydroxy)phenyl]sulfone, 1,1-bis[4-(2-hydroxyethoxy)phenyl]cyclohexane, 4,4'-dihydroxy-p-terphenyl, 4,4'-dihydroxy-p-quarterphenyl). Use can also be made of copolymeric polyesters prepared from two or more of these dicarboxylic acid components and diol components. In addition, polycarboxylic acid components, polyoxy acid components and polyhydroxy components having a functionality of three or more may be copolymerized in component (b) within a range of up to 5 mol %.

The low-melting polymer serving as the soft segments are low-melting polymer segments composed of aliphatic polyether units and/or aliphatic polyester units.

Illustrative examples of aliphatic polyether units include poly(ethylene oxide) glycol, poly(propylene oxide) glycol, poly(tetramethylene oxide) glycol, poly(hexamethylene oxide) glycol, copolymers of ethylene oxide and propylene oxide, ethylene oxide addition polymers of polypropylene oxide) glycols, and copolymers of ethylene oxide and tetrahydrofuran. Illustrative examples of aliphatic polyester units include poly($\epsilon$-caprolactone), polyenantholactone, polycaprylolactone, poly(butylene adipate) and poly(ethylene adipate). Of the above polymers, in terms of the resilience characteristics of the resulting polyester block copolymer, poly(tetramethylene oxide) glycol, ethylene oxide addition polymers of polypropylene oxide) glycol, poly($\epsilon$-caprolactone), poly(butylene adipate) and poly(ethylene adipate) are preferred. Poly(tetramethylene oxide) glycol is especially preferred.

The low-melting polymer segments have a number-average molecular weight in the copolymerized state of preferably about 300 to about 6,000.

Letting the combined amount of high-melting crystalline polymer segments and low-melting polymer segments which are copolymerized to form the thermoplastic polyester elastomer be 100 wt %, it is advantageous for the polyester elastomer to include at least 15 wt %, and preferably at least 50 wt %, but not more than 90 wt %, of the low-melting polymer segments. At a proportion of low-malting polymer segments higher than the above range, adequate melt characteristics suitable for injection molding may not be attainable, which can make it difficult to achieve uniform mixture during melt blending with the other components. On the other hand, if the proportion is too low, sufficient flexibility and resilience may not be achieved.

The above-described thermoplastic polyester elastomer is a copolymer composed primarily of the foregoing high-melting crystalline polymer segments and low-melting polymer segments. The thermoplastic polyester elastomer may be prepared by a known method without particular limitation. Exemplary methods of preparation include methods (i) to (v) below, any of which may be suitably used.

(i) A method in which a lower alcohol diester of a dicarboxylic acid, an excess amount of low-molecular-weight glycol, and the low-melting polymer segment component are subjected to transesterification in the presence of a catalyst, and the resulting reaction products are polycondensed.

(ii) A method in which a dicarboxylic acid, an excess amount of a glycol and the low-melting polymer segment component are subjected to esterification in the presence of a catalyst, and the resulting reaction products are polycondensed.

(iii) A method in which first the high-melting crystalline segments are prepared, then the low-melting segments are added thereto and a transesterification reaction is carried out to effect randomization.

(iv) A method in which the high-melting crystalline segments and the low-melting polymer segments are joined together using a chain linking agent.

(v) In cases where poly($\epsilon$-caprolactone) is used as the low-melting polymer segments, a method in which the high-melting crystalline segments are subjected to an addition reaction with $\epsilon$-caprolactone monomer.

It is recommended that the above-described thermoplastic polyester elastomer have a hardness, as measured in accordance with ASTM D-2240 (Shore D hardness), of generally at least 10, and preferably at least 20, but not more than 50, and preferably not more than 40. It is preferable for the above thermoplastic polyester elastomer to be softer than the component (a) mixture.

Moreover, it is advantageous for the above thermoplastic polyester elastomer to exhibit a high rebound resilience, as measured in accordance with British Standard 903 (BS 903), of generally at least 40%, and preferably at least 50%, but not more than 90%. If the component has too low a rebound resilience, molded materials obtained from the resin composition of the invention will have a low resilience, which may diminish the flight performance of golf balls made therewith.

It is desirable for the above thermoplastic polyester elastomer to have a flexural rigidity, as measured in accordance with JIS K-7106, which is relatively low, with a value of generally at least 5 MPa, preferably at least 10 MPa, and more preferably at least 15 MPa, but not more than 250 MPa, preferably not more than 200 MPa, and even more preferably not more than 150 MPa. If the flexural rigidity is too high, molded materials obtained from the resin composition of the invention will be too rigid, which may worsen the feel on impact and the durability of golf balls made with such molded materials.

Thermoplastic block copolymers that may be used as component (b) include those in which the hard segments are made of crystalline polyethylene blocks (C) and/or crystalline polystyrene blocks (S), and the soft segments are made of polybutadiene blocks (B), polyisoprene blocks (I), blocks of a relatively random copolymer of ethylene and butylene (EB)

or blocks of a relatively random copolymer of ethylene and propylene (EP), preferably blocks of a relatively random copolymer of ethylene and butylene (EB) or blocks of a relatively random copolymer of ethylene and propylene (EP), and most preferably blocks of a relatively random copolymer of ethylene and butylene (EB).

Illustrative examples of such thermoplastic block copolymers include S-EB-S, S-B-S, S-I-S, S-EB, S-EB-S-ED, S-EP-S, S-EB-C, S-B-C, S-I-C, S-EP-C, C-EB-C, C-B-C, C-I-C, C-EB, C-ERB-C-B and C-EP-C. Including crystalline polyethylene blocks (C) as the hard segments is advantageous from the standpoint of resilience. The use of S-EP-C is preferred, and the use of C-EB-C is especially preferred.

If the thermoplastic black copolymer is a C-EB-C or S-EB-C type block copolymer, this may be obtained by hydrogenating butadiene or a styrene-butadiene copolymer.

A polybutadiene in which bonding within the butadiene structure is characterized by the presence of block-like 1,4-polymer regions having a 1,4-bond content of at least 95 wt %, and in which the butadiene structure as a whole has a 1,4-bond content of at least 50 wt %, and preferably at least 80 wt %, may be suitably used here as the polybutadiene or styrene-butadiene copolymer subjected to hydrogenation.

The degree of hydrogenation (conversion of double bonds in the polybutadiene or styrene-butadiene copolymer to saturated bonds) in the hydrogenate is preferably from 60 to 100%, and more preferably from 90 to 100%. Too low a degree of hydrogenation may give rise to undesirable effects such as gelation in the blending step with other components such as an ionomer resin and, when the golf ball is formed, may compromise the weather resistance and durability to impact of the cover.

In the thermoplastic block copolymer, the content of the hard segments is preferably from 10 to 50 wt %. If the content of hard segments to too high, the intermediate layer may lack sufficient flexibility, making it difficult to effectively achieve the objects of the invention. On the other hand, if the content of hard segments is too low, the blend may have a poor moldability.

The thermoplastic block copolymer has a number-average molecular weight of preferably from 30,000 to 800,000. The thermoplastic block copolymer has a melt index at 230° C. of preferably 0.5 to 15 g/10 min, and more preferably 1 to 7 g/10 min. Outside of this range, problems such as weld lines, sink marks and short shots may arise during injection molding.

Thermoplastic polyurethane elastomers that may be used as component (b) preferably have a morphology composed of, in particular, a high-molecular-weight polyol compound as the soft segments, a monomolecular chain extender, and a diisocyanate as the hard segments.

The high-molecular-weight polyol compound is not subject to any particular limitation and may be, for example, a polyester polyol, a polyol polyol, a polyether polyol, a copolyester polyol or a polycarbonate polyol. Exemplary polyester polyols include polycaprolactone glycol, poly(ethylene-1,4-adipate) glycol and poly(butylene-1,4-adipate) glycol; exemplary copolyester polyols include poly(diethylene glycol adipate) glycol; exemplary polycarbonate polyols include (hexanediol-1,6-carbonate) glycol; and exemplary polyether polyols include polyoxytetramethylene glycol.

These high-molecular-weight polyol compounds have a number-average molecular weight of about 600 to about 5,000, and preferably about 1,000 to about 3,000.

An aliphatic or aromatic diisocyanate may be suitably used as the diisocyanate. Illustrative examples include hexamethylene diisocyanate (HDI), 2,2,4- and 2,4,4-trimethylhexamethylene diisocyanate (TMDI), lysine diisocyanate (LDI), tolylene diisocyanate (TDI) and diphenylmethane diisocyanate (MDI). For a good compatibility when blending with other resins, the use of hexamethylene diisocyanate (HDI) or diphenylmethane diisocyanate (MDI) is preferred.

The monomolecular chain extender, which is not subject to any particular limitation, may be an ordinary polyhydric alcohol or polyamine. Specific examples include 1,4-butylene glycol, 1,2-ethylene glycol, 1,3-propylene glycol, 1,6-hexylene glycol, 1,3-butylene glycol, dicyclohexylmethylmethanediamine (hydrogenated MDI) and isophoronediamine (IPDA).

The above thermoplastic polyurethane elastomer has a JIS A hardness of typically from 70 to 100, preferably from 80 to 98, more preferably from 90 to 99, and even more preferably from 95 to 98. At a JIS A hardness below 70, the ball may take on excessive spin when hit with a driver, shortening the distance traveled. No particular limitation is imposed on the specific gravity of the thermoplastic polyurethane elastomer, so long as it is suitably adjusted within a range where the objects of the invention are attainable. The specific gravity is preferably between 1.0 and 1.3, and more preferably between 1.1 and 1.25.

A commercial product may be used as the above-described thermoplastic polyurethane elastomer. Illustrative examples include Pandex TR-3080, Pandex T-7298, Pandex EX-7895, Pandex T-7890 and Pandex T-8198 (all manufactured by DIC Bayer Polymer, Ltd.).

Melt Viscosities of Components (a) & (b) and the Difference Therebetween

It is critical that the difference between the melt viscosity of component (b) and the melt viscosity of component (a), as measured at a shear rate of 6,000 sec$^{-1}$ and 240° C. in accordance with JIS K-7199, satisfy the condition $0 \leq (b)-(a) \leq 25$. The upper limit value is 25 or less, and preferably 20 or less, more preferably 15 or less. By specifying the difference between the melt viscosity of component (b) and the melt viscosity of component (a) to the above-described range, laminar separation during high-speed injection molding can be suppressed, making it possible to increase the durability of the golf ball to cracking. Conversely, outside of the above numerical range, the compatibility between components (a) and (b) worsens, resulting in laminar separation of the resins, particularly after high-speed injection molding, thus dramatically lowering the durability of the ball to cracking. With regard to the range of the melt viscosity of component (a), which is not subject to any particular limitation, the lower limit value is preferably at least 55, more preferably at least 60, and the upper limit value is preferably not more than 100, more preferably not more than 95, even more preferably not more than 90, and most preferably not more than 85. On the other hand, with regard to the range of the melt viscosity of component (b), which is not subject to any particular limitation, the lower limit value is preferably at least 55, more preferably at least 60, and the upper limit value is preferably not more than 100, more preferably not more than 95, even more preferably not more than 90, and most preferably not more than 85. These melt viscosities of component (a) & (b) are set in the above-described range, and if the melt viscosity is too high, the load to the used machine may be too much when kneading the components. In reverse, the melt viscosity is too low, an optimum shearing stress may not be applied in kneading so that the mixing reaction may not be conducted properly, which will be inconvenient.

Component (c)

Next, the thermoplastic block copolymer which contains end blocks modified by a functional group having reactivity with an ionomer resin, wherein both end blocks are formed of different comonomers, and serves as component (c) is described.

The thermoplastic block copolymer serving as the base of component (c) is exemplified by block copolymers of the following types: $H_1$-$S_1$, $H_1$-$S_1$-$H_1$-$S_1$, $H_1$-$(S_1$-$H_1)_n$-$S_1$ and $H_1$-$S_1$-$H_2$ (wherein $H_1$ and $H_2$ are hard segments, and $S_1$ is a soft segment). In particular, the use of an $H_1$-$S_1$ type di-block copolymer or an $H_1$-$S_1H_2$ type tri-block copolymer is preferred. The use of an $H_1$-$S_1$-$H_1$ type tri-block copolymer is more preferred. Compared with the use of other block copolymers, graft copolymers and random copolymers, the compatibility can be markedly improved.

Hard segments that may be used in component (c) are exemplified by crystalline olefin blocks, aromatic vinyl compound blocks, polyester blocks and polyamide blocks. Effective improvement in the compatibility is achieved particularly with the use of preferably crystalline olefin blocks, aromatic vinyl compound blocks or polyester blocks, and more preferably crystalline olefin blocks or aromatic vinyl compound blocks. Crystalline olefin blocks are exemplified by crystalline ethylene blocks (C) and crystalline propylene blocks. The use of crystalline ethylene blocks is especially preferred. Preferred use may be made of styrene blocks (S) as the aromatic vinyl compound blocks, of polytetramethylene terephthalate blocks (PBT) as the polyester blocks, and of nylon blocks as the polyamide blocks.

Soft segments that may be used include polybutadiene blocks (B), polyisoprene blocks (I), blocks of a relatively random copolymer of ethylene and butylene (EB), and blocks of a relatively random copolymer of ethylene and propylene (EP). The use of blocks of a relatively random copolymer of ethylene and butylene (EB) or blocks of a relatively random copolymer of ethylene and propylene (EP) is preferred, and the use of blocks of a relatively random copolymer of ethylene and butylene (EB) is especially preferred.

The thermoplastic block copolymer used as component (c) is made of blocks, with the blocks at either end of the copolymer being formed of different comonomers. Illustrative examples of such thermoplastic block copolymers include S-EB-C, S-B-C, S-I-C, S-EB, S-EB-S-EB, S-EP-C, PBT-S-EB and PBT-S-EB-C. To more effectively improve the compatibility of the ionomer resin and the thermoplastic elastomer, it is preferable to use S-ED-C or PBT-S-EB, and more preferable to use S-EB-C.

If the thermoplastic block copolymer is an S-EB-C type block copolymer, it can be obtained by hydrogenating a styrene-butadiene copolymer.

A polybutadiene in which bonding within the butadiene structure is characterized by the presence of block-like 1,4-polymer regions having a 1,4-bond content of at least 95 wt %, and in which the butadiene structure as a whole has a 1,4-bond content of at least 50 wt %, and preferably at least 80 wt %, may be suitably used here as the polybutadiene or styrene-butadiene copolymer in hydrogenation.

The degree of hydrogenation (conversion of double bonds in the polybutadiene or styrene-butadiene copolymer to saturated bonds) in the hydrogenate of the styrene-butadiene copolymer is preferably 60 to 100%, and more preferably 90 to 100%. Too low a degree of hydrogenation may give rise to undesirable effects such as gelation in the blending step with other components such as an ionomer resin and, when the golf ball is formed, may compromise the weather resistance and the durability of the ball to impact.

In the above block copolymer having crystalline olefin blocks, the content of the hard segments is preferably from 10 to 50 wt %. If the content of hard segments is too high, the intermediate layer may lack sufficient flexibility, making it difficult to effectively achieve the objects of the invention. On the other hand, if the content of hard segments is too low, the resulting blend may have a poor moldability.

The block copolymer having such crystalline olefin blocks has a number-average molecular weight of preferably from 30,000 to 800,000.

In the practice of the invention, only the end blocks on the thermoplastic block copolymer are modified with functional groups. The compatibility can be very effectively improved in this way compared with when only intermediate blocks are modified, when both intermediate blocks and blocks are modified, or when modification is carried out along the entire molecule, as in random copolymers.

The end block modifying method is preferably a method in which only the ends of molecule are modified. This has the advantage that more functional groups than necessary do not react with an ionomer resin and increase the viscosity of the mixture. Moreover, the compatibility can be very effectively improved because the molecular ends of the block copolymer bond with the ionomer resin.

If the functional groups which react with an ionomer resin have too high a reactivity, the viscosity will decrease, whereas a reactivity which is too low will lower the compatibility-improving effect. Hence, it is preferable for the functional groups to have a moderate degree of reactivity. Examples of such functional groups that may be used include, in order of decreasing preference, amino groups, acid anhydride groups, and epoxy groups. Amino groups are especially preferred.

The thermoplastic block copolymer has a melt index at 230° C. of preferably from 0.5 to 15 g/10 min, and more preferably from 1 to 7 g/10 min. Outside of this range, problems such as weld lines, sink marks and short shots may arise during injection molding.

The above components are compounded in a weight ratio a/b/c of 50 to 80/50 to 20/4 to 20. In this ratio, the range of component (a) is preferably at least 60%, more preferably at least 65%, and even more preferably at least 70%, but preferably not more than 75%. The range of component (b) is preferably at least 23%, and more preferably at least 25%, but preferably not more than 40%, and even more preferably not more than 30%. The range of component (c) is preferably at least 5%, but preferably not more than 15%, more preferably not more than 10%, and even more preferably not more than 7%. Outside of this range, resilience cannot be achieved and the compatibility worsens, as a result of which laminar separation may arise.

Component (e)

Component (e) is a fatty acid or fatty acid derivative having a molecular weight of at least 280 but not more than 1.500. Compared with the base resin, this component has a very low molecular weight and, by suitably adjusting the melt viscosity of the mixture, helps in particular to improve the flow properties. Component (e) includes a relatively high content of acid groups (or derivatives), and is capable of suppressing an excessive loss in resilience.

The fatty acid or fatty acid derivative of component (e) has a molecular weight of at least 280, preferably at least 300, more preferably at least 330, and even more preferably at least 360, but not more than 1,500, preferably not more than 1,000, even more preferably not more than 600, and most preferably not more than 500. If the molecular weight is too low, the heat resistance cannot be improved. On the other hand, if the molecular weight is too highs the flow properties cannot be improved.

The fatty acid or fatty acid derivative of component (e) may be an unsaturated fatty acid (or derivative thereof) containing a double bond or triple bond on the alkyl moiety, or it may be a saturated fatty acid (or derivative thereof) in which the bonds on the alkyl moiety are all single bonds. It is recommended that the number of carbons on the molecule be preferably at least 18, more preferably at least 20, even more preferably at least 22, and most preferably at least 24, but not more than 80, preferably not more than 60, more preferably not more than 40, and even more preferably not more than 30. Too few carbons may make it impossible to improve the heat resistance and may also make the acid group content so high as to diminish the flow-improving effect due to interactions with acid groups present in the base resin. On the other hand, too many carbons increases the molecular weight, as a result of which a distinct flow-improving effect may not appear.

Specific examples of the fatty acid of component (e) include stearic acid, 12-hydroxystearic acid, behenic acid, oleic acid, linoleic acid, linolenic acid, arachidic acid and lignoceric acid. Of these, stearic acid, arachidic acid, behenic acid and lignoceric acid are preferred. Behenic acid is especially preferred.

The fatty acid derivative of component (e) is exemplified by metallic soaps in which the proton on the acid group of the fatty acid has been replaced with a metal ion. Examples of the metal ion include $Na^+$, $Li^+$, $Ca^{++}$, $Mg^{++}$, $Zn^{++}$, $Mn^{++}$, $Al^{+++}$, $Ni^{++}$, $Fe^{++}$, $Fe^{+++}$, $Cu^{++}$, $Sn^{++}$, $Pb^{++}$ and $Co^{++}$. Of these, $Ca^{++}$, $Mg^{++}$ and $Zn^{++}$ are especially preferred.

Specific examples of fatty acid derivatives that may be used as component (e) include magnesium stearate, calcium stearate, zinc stearate, magnesium 12-hydroxystearate, calcium 12-hydroxystearate, zinc 12-hydroxystearate, magnesium arachidate, calcium arachidate, zinc arachidate, magnesium behenate, calcium behenate, zinc behenate, magnesium lignocerate, calcium lignocerate and zinc lignocerate. Of these, magnesium stearate, calcium stearate, zinc stearate, magnesium arachidate, calcium arachidate, zinc arachidate, magnesium behenate, calcium behenate, zinc behenate, magnesium lignocerate, calcium lignocerate and zinc lignocerate are preferred.

The amount of component (e) must be from 5 to 150 parts by weight per 100 parts by weight of the base polymer, and is preferably at least 10 parts by weight, and more preferably at least 15 parts by weight, but preferably not more than 100 parts by weight, and more preferably not more than 50 parts by weight, most preferably not more than 20 parts by weight. Resilience will not be achieved if component (e) is added in an amount below the above range. On the other hand, if component (e) is added in an amount exceeding the above range, a large amount of gas will be generated during injection molding, causing molding defects.

Component (f)

Illustrative examples of the metal ions in the basic inorganic metal compound serving as component (f) include $Li^+$, $Na^+$, $K^+$, $Ca^{++}$, $Mg^{++}$, $Zn^{++}$, $Al^{+++}$, $Ni^{++}$, $Fe^{++}$, $Fe^{+++}$, $Cu^{++}$, $Mn^{++}$, $Sn^{++}$, $Pb^{++}$ and $Co^{++}$. Known basic inorganic fillers containing these metal ions may be used as the basic inorganic metal compound. Specific examples include magnesium oxide, magnesium hydroxide, magnesium carbonate, zinc oxide, sodium hydroxide, sodium carbonate, calcium oxide, calcium hydroxide, lithium hydroxide and lithium carbonate. In particular, a hydroxide or a monoxide is recommended. Calcium hydroxide and magnesium oxide, which have a high reactivity with the base resin, are more preferred. Calcium hydroxide is especially preferred.

Component (f) must be included in an amount, per 100 parts by weight of the base polymer, of from 0.1 to 10 parts by weight. The amount of component (f) is preferably at least 0.5 part by weight, and more preferably at least 1.0 part by weight, but not more than 8 parts by weight, and more preferably not more than 5 parts by weight. If component (f) is added in an amount lower than the above range, resilience may not be achieved. On the other hand, if component (f) is added in an amount greater than the above range, the flow properties during injection molding will decrease, resulting in molding defects.

Other Components

In the practice of the invention, inorganic fillers which are non-reactive with ionomer resins may additionally be added in an amount of from 10 to 30 parts by weight per 100 parts by weight of the base polymer.

In such a case, to effectively improve the durability of the cover composition, the average particle size of the inorganic filler is preferably at least 0.01 µm, more preferably at least 0.05 µm, and even more preferably at least 0.1 µm, but preferably not more than 5 µm, more preferably not more than 3 µm, and even more preferably not more than 1 µm.

To adjust the specific gravity of the cover composition, the specific gravity of the inorganic filler is preferably at least 2, and more preferably at least 4, but preferably not more than 7, and more preferably not more than 5.

The above-mentioned "non-reactivity with ionomer resins" is verified by the absence of foaming or a large rise in viscosity when the inorganic filler is melt-mixed with an ionomer resin. For example, when an amount of inorganic filler such as may be used in the invention is added to the typical ionomer resin available under the trade name "Himilan 1605" and mixed at 200° C. for 5 minutes, if foaming does not arise and the melt index after mixing is 1 or more, the inorganic filler may be regarded as having no reactivity with the ionomer resin.

Examples of such inorganic fillers include barium sulfate, titanium dioxide and hard clay. Barium sulfate is especially preferred. The use of precipitated barium sulfate is preferred because of its particle size stability.

The materials which may be used in the layers other than the above intermediate layer are not subject to any particular limitation and include, for example, thermoplastic or thermoset polyurethane elastomers, polyester elastomers, ionomer resins, highly neutralized ionomer resins, polyolefin elastomers or mixtures thereof. Any one of these may be used alone or two or more types may be used in admixture. Especially preferred examples include ionomer resins and highly neutralized ionomer resins.

The intermediate layer has a thickness per layer of typically at least 0.5 mm, preferably at least 0.8 mm, and more preferably at least 1.0 mm, but not more than 1.2 mm, and preferably not more than 1.1 mm. If the thickness is too large, the resilience may decrease. If the cover thickness is too small, the durability of the ball may decrease.

The material used in at least one intermediate layer has a Shore D hardness of preferably at least 45, more preferably at least 47, even more preferably at least 50, and most preferably at least 52, but preferably not more than 65, more preferably not more than 63, even more preferably not more than 60, and most preferably not more than 58. If the intermediate layer material is too soft, the spin rate may increase, lowering the flight performance. On the other hand, if the intermediate layer material is too hard, the feel on impact of the ball may worsen.

If the golf ball of the invention has a plurality of intermediate layers, the above-described material must be used in at least one of the intermediate layers.

In the practice of the invention, the material used to form the outermost layer serving as the golf ball cover may be any suitable material selected from among known materials insofar as the objects of the invention are attainable. Example include thermoplastic or thermoset polyurethane elastomers, polyester elastomers, ionomer resins, polyolefin elastomers and mixtures thereof. These may be used singly or as mixtures of two or more thereof. Thermoplastic polyurethane elastomers and ionomer resins are especially preferred.

Illustrative examples of thermoplastic polyurethane elastomers that may be used for the above purpose include commercial products in which the diisocyanate is an aliphatic or aromatic compound, such as Pandex T7298, Pandex T7295, Pandex T7890, Pandex TR3080, Pandex T8295, Pandex T8290 and Pandex T8260 (all manufactured by DIC Bayer Polymer, Ltd.). Illustrative examples of suitable commercial ionomer resins include Surlyn 6320, Surlyn 8120 and Surlyn 9945 (all products of E.I. DuPont de Nemours and Co., Inc.), and Himilan 1706, Himilan 1605, Himilan 1855, Himilan 1601, Himilan 1557, Himilan 1555, Himilan AM7331 and Himilan 1601 (all products of DuPont-Mitsui Polychemicals Co., Ltd.).

Moreover, to improve the rebound and scuff resistance of the ball, it is preferable to use a material formed of (A) and (B) below as the cover:
(A) a thermoplastic polyurethane material (including a thermoplastic urethane elastomer), and
(B) an isocyanate mixture of (b-1) an isocyanate compound having two or more isocyanate groups as functional groups per molecule dispersed in (b-2) a thermoplastic resin which is substantially non-reactive with isocyanate.

The thermoplastic resin (b-2) is preferably a resin having a low water absorption and excellent compatibility with thermoplastic polyurethane materials. Illustrative examples of such resins include polystyrene resins, polyvinyl chloride resins, ABS resins, polycarbonate resins and polyester elastomers (e.g., polyether-ester block copolymers, polyester-ester block copolymers). From the standpoint of rebound resilience and strength, the use of a polyether-ester block copolymer is especially preferred. Illustrative, non-limiting, examples of the isocyanate compound include aromatic diisocyanates such as 4,4'-diphenylmethane diisocyanate, 2,4-toluene diisocyanate and 2,6-toluene diisocyanate; and aliphatic diisocyanates such as hexamethylene diisocyanate. From the standpoint of reactivity and work safety, the use of 4,41-diphenylmethane diisocyanate is most preferred.

To ensure particularly suitable flow properties for injection molding and improve moldability, it is preferable to adjust the melt indices of the intermediate layer material and the cover material. It is recommended that the melt index (MI), as measured at a test temperature of 190° C. and under a test load of 21.2 N (2.16 kgf) in accordance with JIS K-6760, be at least 0.5 dg/min, preferably at least 1 dg/min, more preferably at least 1.5 dg/min, and even more preferably at least 2 dg/min, but not more than 20 dg/min, preferably not more than 10 dg/min, more preferably not more than 5 dg/min, and even more preferably not more than 3 dg/min. A melt index which is too high or too low may dramatically lower the processability.

The cover serving as the outermost layer has a thickness of generally at least 0.5 mm, preferably at least 0.7 mm, and more preferably at least 0.8 mm, but generally not more than 2.0 mm, preferably not more than 1.5 mm, and more preferably not more than 1.2 mm. Too large a thickness may lower the rebound of the ball, whereas too small a cover thickness may lower the durability of the ball.

The Shore D hardness of the material used to form the cover serving as the outermost layer is generally at least 30, preferably at least 35, more preferably at least 40, and most preferably at least 45, but preferably not more than 60, more preferably not more than 58, even more preferably not more than 56, and most preferably not more than 54. If the cover is too soft, the spin rate of the ball on shots with a driver may increase, lowering the flight performance. On the other hand, if the cover is too hard, the spin rate on approach shots may decrease and the feel of the ball on impact may worsen.

As with the method of forming the cover in conventional golf balls, any of various known methods such as injection molding or compression molding may be employed to form the above-described intermediate layer and the cover serving as the outermost layer in the inventive golf ball. Likewise, the intermediate layer and the cover may be easily formed by suitable selection of the various molding conditions such as the injection temperature and time from within the commonly used ranges. For example, use may be made of a process in which, depending on the type of ball, a prefabricated core is placed within a mold, following which the materials for the intermediate layer and the cover are respectively mixed and melted under applied heat, and successively injection-molded around the core. Alternatively, use may be made of a process in which a pair of hemispherical half-cups are molded beforehand from the cover material of the invention, then placed around a spherical body composed of the core encased within the intermediate layer and molded under pressure at 120 to 170° C. for 1 to 5 minutes.

In the golf ball of the invention, the cover may have a plurality of dimples formed on the surface thereof, in addition to which the cover may be administered various treatments such as surface preparation, stamping and painting. In particular, the ease of operation involved in administering such surface treatment to a golf ball cover made of the cover material of the invention can be improved on account of the good moldability of the cover surface.

The volume occupancy VR (units: %) of the dimples on the surface of the golf ball is defined as the ratio of the volume of the dimples on the golf ball surface to the volume of a hypothetical golf ball without dimples. For shots taken with a driver (W#1), the VR value of the inventive golf ball is generally at least 0.66, preferably at least 0.70, and more preferably at least 0.75, but not more than 0.85, preferably not more than 0.82, and more preferably not more than 0.79. If the VR value is too small, the ball may describe a high trajectory that results in little roll and thus shortens the total distance traveled by the ball. On the other hand, if the VR value is too large, the ball may describe a flattened trajectory that fails to deliver the desired carry and consequently shortens the total distance of travel.

The golf ball of the invention, which can be manufactured so as to conform with the Rules of Golf for competitive play, may be produced to a ball diameter which is not less than 42.67 mm, and preferably not more than 43.00 mm, and to a weight which is not more than 45.93 g, and preferably at least 44.6 g.

As explained above, the golf ball of the invention has a core, a cover serving as the outermost layer and, interposed therebetween, a thin intermediate layer of a desired hardness and a high quality. The ball is endowed with a good rebound, an excellent flight performance and an excellent durability to cracking on repeated impact.

EXAMPLES

The following Examples of the invention and Comparative Examples illustrate but do not limit the invention.

Examples 1 to 4, Comparative Examples 1 to 4

In each example, a solid core was fabricated by preparing a core composition from the common formulation shown in Table 1, then carrying out molding and vulcanization at a vulcanizing temperature and time of 160° C. and 13 minutes. A first intermediate layer (envelope layer) was molded for this core from the formulation shown in Table 3, following which a second intermediate layer and a cover as the outermost layer were respectively injection-molded from the common formulations shown in Table 2. The first and second intermediate layers and the outermost cover layer were then successively placed and formed around the solid core, thereby producing multi-piece solid golf balls. The physical properties and other characteristics of the resulting four-layer golf balls are shown in Table 3.

TABLE 1

| Core formulation | Polybutadiene rubber | 100 |
|---|---|---|
| | Zinc oxide | 16 |
| | Zinc stearate | 5.0 |
| | Zinc salt of pentachlorothiophenol | 1.0 |
| | Antioxidant | 0.1 |
| | Zinc acrylate | 39.0 |
| | Peroxide | 3.0 |
| | Sulfur | 0.1 |
| Core properties | Specific gravity | 1.17 |
| | Diameter (mm) | 36.4 |
| | Weight (g) | 29.4 |
| | Deflection (mm) | 3.2 |

Note:
Numbers in the table represent parts by weight.

Trade names for the chief materials appearing in Table 1 are as follows.

Polybutadiene rubber: Produced by JSR Corporation under the trade name "BR 730"

Zinc stearate: Produced by NOP Corporation under the trade name "Zinc Stearate G"

Antioxidant: 2,2-methylenebis(4-methyl-6-butylphenol), produced by Ouchi Shinko Chemical is Industry Co., Ltd. under the trade name "Nocrac NS-6"

Peroxide: 40% Dilution in silica of 1,1-di(t-butylperoxy)cyclohexane, produced by NOF Corporation under the trade name "Perhexa C40"

TABLE 2

| Second intermediate layer | Formulation (parts by weight) | Ionomer | 68.75 |
|---|---|---|---|
| | | Olefinic thermoplastic elastomer | 31.25 |
| | | Behenic acid | 18 |
| | | Polyolefin polyol | 2 |
| | | Calcium hydroxide | 2.3 |
| | Specific gravity | | 0.93 |
| | Physical properties | Resin sheet hardness (Shore D) | 56 |
| | | Thickness (mm) | 1.2 |

TABLE 2-continued

| Cover layer | Formulation (parts by weight) | Thermoplastic Polyurethane A | 50 |
|---|---|---|---|
| | | Thermoplastic Polyurethane B | 50 |
| | | Titanium oxide | 4 |
| | | Polyethylene wax | 1.5 |
| | | Isocyanate mixture | 15 |
| | Specific gravity | | 1.16 |
| | Thickness (mm) | | 1.0 |
| | Material surface hardness (Shore D) | | 48 |

Note:
Numbers in the table represent parts by weight.

Trade names for the chief materials appearing in Table 2 are as follows.

Ionomer An ionomer resin which is a sodium ion-neutralized ethylene-methacrylic acid copolymer produced by DuPont-Mitsui Polychemicals Co., Ltd. under the trade name "Himilan 1605."

Olefinic thermoplastic elastomer:
A hydrogenated polymer produced by JSR Corporation under the trade name "DR 6100P."

Behenic acid: Produced by NOF Corporation under the trade name "NAA-222S (powder)."

Polyolefin polyol: A low-molecular-weight polyolefin polyol produced by Mitsubishi Chemical Corporation under the trade name "Polytail H."

Calcium hydroxide: Produced by Shiraishi Calcium Kaisha, Ltd. under the trade name "CLS-B."

Thermoplastic: Polyurethane A:
MDI-PTMG type thermoplastic polyurethane produced by DIC Bayer Polymer under the trade name "Pandex T-8290."

Thermoplastic Polyurethane B:
MDI-PTMG type thermoplastic polyurethane produced by DIC Bayer Polymer under the trade name "Pandex T-8295."

Titanium oxide: Produced by Ishihara Sangyo Kaisha, Ltd. under the trade name "Tipaque R550."

Polyethylene wax: Produced by Sanyo Chemical Industries, Ltd. under the trade name "Sanwax 161P."

Isocyanate mixture: Crossnate EM30 (trade name), an isocyanate masterbatch which is produced by Dainichi Seika Colour & Chemicals Mfg. Co., Ltd., contains 30% of 4,4'-diphenylmethane diisocyanate (measured concentration of amine reverse-titrated isocyanate according to JIS K-1556, 5 to 10%), and in which the masterbatch base resin is a polyester elastomer (Hytrel 4001, produced by DuPont-Toray Co., Ltd.). The isocyanate mixture was mixed at the time of injection molding.

TABLE 3

| | | | Example | | | | Comparative Example | | | |
|---|---|---|---|---|---|---|---|---|---|---|
| | | | 1 | 2 | 3 | 4 | 1 | 2 | 3 | 4 |
| First intermediate layer material | Component (a) | Himilan 1555 | 25 | 17.5 | 19 | | 35 | 32 | 35 | 41 |
| | | Himilan 1557 | 35 | 35 | 38 | 35 | 35 | 32 | 35 | 41 |
| | | AM 7331 | 10 | 17.5 | 19 | | | | | |
| | | Himilan 1601 | | | | 35 | | | | |
| | (b) | Primalloy N2800 | 25 | 25 | 20 | 25 | 25 | 30 | 25 | 15 |
| | (c) | Terminal amino-modified S-EB-C type thermoplastic block copolymer | 5 | 5 | 4 | 5 | 5 | 6 | 5 | 3 |
| | (d) | Barium sulfate | 20 | 20 | 20 | 20 | 20 | 20 | 20 | 20 |
| | | Magnesium stearate | 1 | 1 | 1 | 1 | 1 | 1 | 1 | 1 |
| | (e) | Behenic acid | 17 | 17 | 17 | 17 | | 17 | 17 | 17 |
| | (f) | Calcium hydroxide | 2.2 | 2.2 | 2.2 | 2.2 | | 2.2 | 2.2 | 2.2 |
| | Shore D hardness | | 53 | 52 | 53 | 54 | 53 | 52 | 54 | 56 |
| | Specific gravity | | 1.10 | 1.10 | 1.10 | 1.10 | 1.12 | 1.11 | 1.10 | 1.09 |

TABLE 3-continued

|  |  | Example | | | | Comparative Example | | | |
| --- | --- | --- | --- | --- | --- | --- | --- | --- | --- |
|  |  | 1 | 2 | 3 | 4 | 1 | 2 | 3 | 4 |
| Thickness (mm) | | 0.95 | 0.95 | 0.95 | 0.95 | 0.95 | 0.95 | 0.95 | 0.95 |
| First intermediate layer-covered sphere (mm) | | 38.3 | 38.3 | 38.3 | 38.3 | 38.3 | 38.3 | 38.3 | 38.3 |
| Ball diameter (mm) | | 42.7 | 42.7 | 42.7 | 42.7 | 42.7 | 42.7 | 42.7 | 42.7 |
| Ball deflection (mm) | | 2.44 | 2.43 | 2.45 | 2.43 | 2.49 | 2.48 | 2.45 | 2.42 |
| Initial velocity (USGA equivalent) (m/s) | | 77.3 | 77.3 | 77.3 | 77.4 | 77.1 | 77.3 | 77.3 | 77.2 |
| COR durability | | good | good | good | good | good | NG | NG | good |
| Melt viscosity | Component (a) (Pa·s) | 62.4 | 68.9 | 68.8 | 76.8 | 52.3 | 52.3 | 52.3 | 52.3 |
|  | Component (b) (Pa·s) | 81.2 | 81.2 | 81.2 | 81.2 | 81.2 | 81.2 | 81.2 | 61.2 |
| Difference Viscosity (domain-matrix) | | 18.8 | 12.3 | 12.4 | 4.4 | 28.9 | 28.9 | 28.9 | 28.9 |

The intermediate layer material formulation is shown in parts by weight.

Trade names and other details for the above materials are as follows.

Himilan 1555 (trade name):
  An ionomer resin which is a sodium ion-neutralized ethylene-methacrylic acid copolymer produced by DuPont-Mitsui Polychemicals Co., Ltd.

Himilan 1557 (trade name):
  An ionomer resin which is a zinc ion-neutralized ethylene-methacrylic acid copolymer produced by DuPont-Mitsui Polychemicals Co., Ltd.

AM 7331 (trade name): An ionomer resin which is a sodium ion-neutralized ethylene-methacrylic acid-acrylic acid ester copolymer produced by DuPont-Mitsui Polychemicals Co., Ltd.

Himilan 1601 (trade name):
  An ionomer resin which is a sodium ion-neutralized ethylene-methacrylic acid copolymer produced by DuPont-Mitsui Polychemicals Co., Ltd.

Primalloy N2800 (trade name):
  A thermoplastic polyester elastomer produced by Mitsubishi Chemical Corporation.

Terminal amino-modified S-EB-C type thermoplastic block copolymer:
  Produced by JSR Corporation under the trade name "Dynaron 4630P."

Barium sulfate: Produced by Sakai Chemical Industry Co., Ltd. under the trade name "Precipitated Barium Sulfate #300."

Magnesium stearate: Produced by NOF Corporation (Uji Sangyo) under the trade name "Nissan Magnesium Stearate."

Behenic acid: Produced by NOF Corporation (Uji Sangyo) under the trade name "NAA-222S (powder)."

Calcium hydroxide: Produced by Shiraishi Calcium Kaisha, Ltd. under the trade name "CLS-B."

Melt Viscosity Measurement
  Measured in accordance with JIS K-7199 using a capillary viscometer (Capillograph 1C, manufactured by Toyo Seiki Seisaku-Sho, Ltd.). The measurement conditions were as follows: temperature, 240° C.; capillary, L/D=10.0/1.0 mm. The melt viscosity (Pa·s) of specimens was measured at a shear rate of 6,000 sec$^{-1}$ at a piston speed setting of 500 mm/min.

Cover Resin Hardness
  The Shore D hardness measured in accordance with ASTM D-2240.

Ball Deflection (mm)
  The amount of deformation (mm) by the golf ball when compressed under a final load of 1,275 N (130 kgf) from an initial load state of 98 N (10 kgf) was determined.

Initial Velocity of Ball (m/s)
  The initial velocity was measured using an initial velocity measuring apparatus of the same type as that of the official golf ball regulating-body—R&A (USGA), and in accordance with R&A (USGA) rules.

Durability to Repeated Impact
  The golf ball was repeatedly struck at a head speed (HS) of 45 m/s, and the durability to repeated impact was rated as the number of shots that had been taken with the ball when the rebound underwent consecutive decreases of 3%. Each value shown in the table is the average number of shots for three balls.

Good: Did not exhibit cracking even after 200 or more shots.
  Fair: Some balls exhibited cracking after less than 200 shots.
  NG: Exhibited cracking after less than 200 shots.

Extrusion
  The reaction twin-screw extruder used for the examples of the invention was a co-rotating intermeshing twin-screw extruder (screw diameter, 32 mm; L/D=30; main motor output, 7.5 kW; with vacuum vent) of the type commonly used for material mixture.

As is apparent from the results in Table 3 above, in Comparative Example 1, because components (e) and (f) were not added, the first Intermediate layer had a low degree of neutralization, substantially lowering the resilience. In Comparative Examples 2 and 3, the difference of the malt viscosities between (a) and (b), (that is, (b)–(a)) was too large, resulting in laminar separation of the resins during high-speed injection molding and thus substantially lowering the durability. In Comparative Example 4, the amount of component (b) added was small, resulting in a lower resilience.

The invention claimed is:

1. A golf ball comprising a core, an outermost cover layer and one or more intermediate layer therebetween, wherein at least one intermediate layer includes a mixture comprising:
  100 parts by weight of a base polymer composed of
  (a) a metal ion neutralization product of an olefin-unsaturated carboxylic acid random copolymer and/or a metal ion neutralization product of an olefin-unsaturated carboxylic acid-unsaturated carboxylic acid ester random copolymer,
  (b) a thermoplastic elastomer selected from the group consisting of thermoplastic polyester elastomers, thermoplastic block copolymers and thermoplastic polyurethanes, and (c) a thermoplastic block copolymer containing end blocks modified by a functional group having reactivity with an ionomer resin, both end blocks being formed of different comonomers in a weight ratio a/b/c =50 to 80/50 to 20/4 to 20, (e) 5 to 150 parts by weight of an organic acid of 18 to 40 carbons or a derivative thereof, and (f) 0.1 to 10 parts by weight of a metal ion source selected from the group consisting of alkali metals, alkaline earth metals and transition metals;

which mixture satisfies the condition $0 \leqq (b)-(a) \leqq 25$, where (b)-(a) is the difference between the melt viscosity of component (b) and the melt viscosity of component (a) as measured at a shear rate of 6,000 sec-1 and 240° C. in accordance with JIS K 7199.

2. The golf ball of claim 1, wherein the mixture additionally comprises 10 to 30 parts by weight of an inorganic filler which is non-reactive with the ionomer resin (d) per 100 parts by weight of the base polymer.

3. The golf ball of claim 2, wherein component (b) is a thermoplastic polyester elastomer.

4. The golf ball of claim 1, wherein the intermediate layer comprised of above components (a) to (f) has a thickness of at most 1.2 mm.

5. The golf ball of claim 1, wherein the material used in at least one intermediate layer has a Shore D hardness of at least 45 but not more than 65.

* * * * *